United States Patent
Tomanec et al.

(10) Patent No.: US 10,227,916 B2
(45) Date of Patent: Mar. 12, 2019

(54) TURBOCHARGER TURBINE WASTEGATE ASSEMBLY

(71) Applicant: Garrett Transportation I Inc., Torrance, CA (US)

(72) Inventors: Filip Tomanec, Luhacovice (CZ); Antonin Forbelsky, Brno (CZ); Vaclav Kadlec, Brno (CZ); Damien Marsal, Golbey (FR)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 15/795,251

(22) Filed: Oct. 26, 2017

(65) Prior Publication Data

US 2018/0045105 A1 Feb. 15, 2018

Related U.S. Application Data

(63) Continuation-in-part of application No. 15/218,045, filed on Jul. 24, 2016, and a continuation-in-part of application No. 15/218,048, filed on Jul. 24, 2016.

(51) Int. Cl.
*F02B 33/44* (2006.01)
*F02D 23/00* (2006.01)
(Continued)

(52) U.S. Cl.
CPC .......... *F02B 37/186* (2013.01); *F01D 17/105* (2013.01); *F02B 37/183* (2013.01); *F16C 17/00* (2013.01); *F05D 2220/40* (2013.01)

(58) Field of Classification Search
CPC ............... F02B 37/186; F02B 37/18
(Continued)

(56) References Cited

U.S. PATENT DOCUMENTS

| 7,644,583 | B2 * | 1/2010 | Leavesley | F02B 37/18 60/602 |
|---|---|---|---|---|
| 2013/0287552 | A1 * | 10/2013 | House | F02B 37/186 415/170.1 |
| 2014/0072412 | A1 * | 3/2014 | Marques | F02B 37/183 415/144 |

FOREIGN PATENT DOCUMENTS

EP 2 253 816 A1 11/2010
EP 2253816 A1 * 11/2010 ............. F02D 9/106
(Continued)

OTHER PUBLICATIONS

EPO Extended European Search Report, Application No. 17200440. 0-1004, dated May 25, 2018 (10 pages).
(Continued)

*Primary Examiner* — Thai Ba Trieu
(74) *Attorney, Agent, or Firm* — Brian J. Pangrle

(57) ABSTRACT

A turbocharger turbine wastegate assembly includes a turbine housing that includes a wastegate seat and a bore; a bushing with a stepped bore that includes an axial face; a wastegate that includes a shaft, a plug and an arm, where the shaft includes an end portion, a first axial face, a journal portion, a second axial face and a shoulder portion, where the first axial face is defined at least in part by an end portion diameter and a journal portion diameter, and where the second axial face is defined at least in part by the journal portion diameter and a shoulder portion diameter; a mesh spacer disposed radially about an axial length of the end portion of the shaft between the axial face of the stepped bore of the bushing and the first axial face of the shaft; and a control arm connected to the end portion of the shaft where an axial length of the bushing is disposed between the mesh spacer and the control arm.

15 Claims, 14 Drawing Sheets

(51) Int. Cl.
*F02B 37/18* (2006.01)
*F01D 17/10* (2006.01)
*F16C 17/00* (2006.01)

(58) Field of Classification Search
USPC .......................................................... 60/602
See application file for complete search history.

(56) References Cited

FOREIGN PATENT DOCUMENTS

| EP | 2574754 A2 * | 4/2013 | ............ F02B 37/186 |
|---|---|---|---|
| EP | 2 693 016 A2 | 2/2014 | |
| EP | 2 708 715 A2 | 3/2014 | |
| JP | H05-248253 A | 9/1993 | |
| WO | 2012/094153 A2 | 7/2012 | |
| WO | WO 2013048687 A1 * | 4/2013 | ............ F02B 37/186 |
| WO | WO 2013173055 A1 * | 11/2013 | ............. F16J 15/186 |
| WO | 2015/171541 A1 | 11/2015 | |

OTHER PUBLICATIONS

Extended European search report, EP Application No. 17180148.3-1616, dated Oct. 27, 2017 (7 pages).
Extended European search report, EP Application No. 17180151.7-1616, dated Oct. 27, 2017 (9 pages).

\* cited by examiner

TURBOCHARGER TURBINE WASTEGATE ASSEMBLY

RELATED APPLICATIONS

This application is a continuation-in-part of a co-pending U.S. patent application having Ser. No. 15/218,045, filed 24 Jul. 2016, which is incorporated by reference herein, and this application is a continuation-in-part of a co-pending U.S. patent application having Ser. No. 15/218,048, filed 24 Jul. 2016, which is incorporated by reference herein.

TECHNICAL FIELD

Subject matter disclosed herein relates generally to turbomachinery for internal combustion engines and, in particular, to turbocharger turbine wastegate assemblies.

BACKGROUND

A turbocharger turbine wastegate is typically a valve that can be controlled to selectively allow at least some exhaust to bypass a turbine. Such a valve may be part of an assembly such as a turbocharger turbine wastegate assembly, which can be part of a turbocharger. Where an exhaust turbine drives a compressor for boosting inlet pressure to an internal combustion engine (e.g., as in a turbocharger), a wastegate provides a means to control the boost pressure.

A so-called internal wastegate is integrated at least partially into a turbine housing. An internal wastegate typically includes a flapper valve (e.g., a plug), a crank arm, a shaft or rod, and an actuator. A plug of a wastegate often includes a flat disk shaped surface that seats against a flat seat (e.g., a valve seat or wastegate seat) disposed about an exhaust bypass opening, though various plugs may include a protruding portion that extends into an exhaust bypass opening (e.g., past a plane of a wastegate seat).

In a closed position, a wastegate plug should be seated against a wastegate seat (e.g., seating surface) with sufficient force to effectively seal an exhaust bypass opening (e.g., to prevent leaking of exhaust from a high pressure exhaust supply to a lower pressure region). Often, an internal wastegate is configured to transmit force from an arm to a plug (e.g., as two separate, yet connected components). During engine operation, load requirements for a wastegate vary with pressure differential. High load requirements can generate high mechanical stresses in a wastegate's kinematics components, a fact which has led in some instances to significantly oversized component design to meet reliability levels (e.g., as demanded by engine manufacturers). Reliability of wastegate components for gasoline engine applications is particularly important where operational temperatures and exhaust pulsation levels can be quite high.

Various examples of wastegates, wastegate components and wastegate related processes are described herein.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
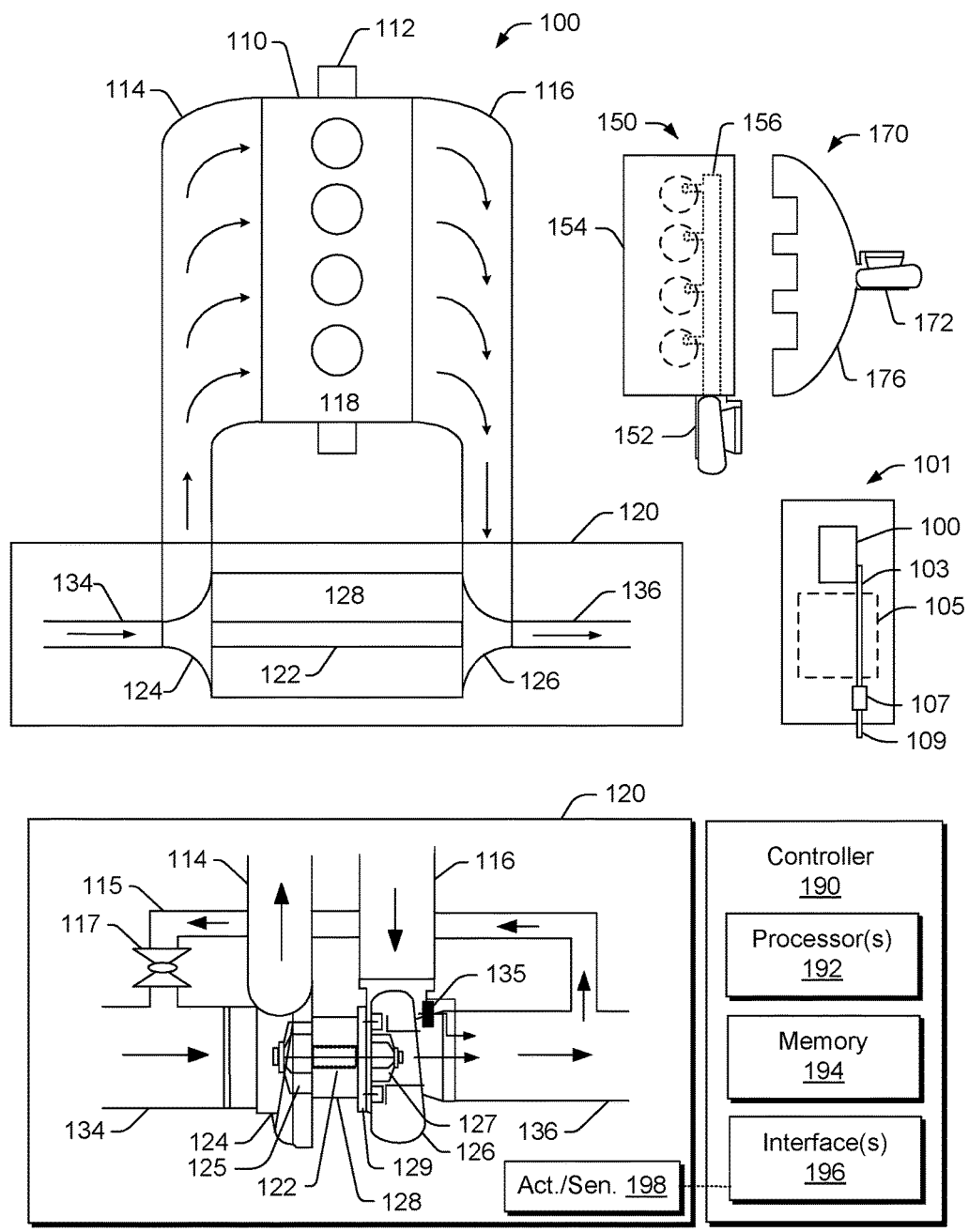
FIG. 1 is a diagram of a turbocharger and an internal combustion engine along with a controller and an example of a vehicle.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
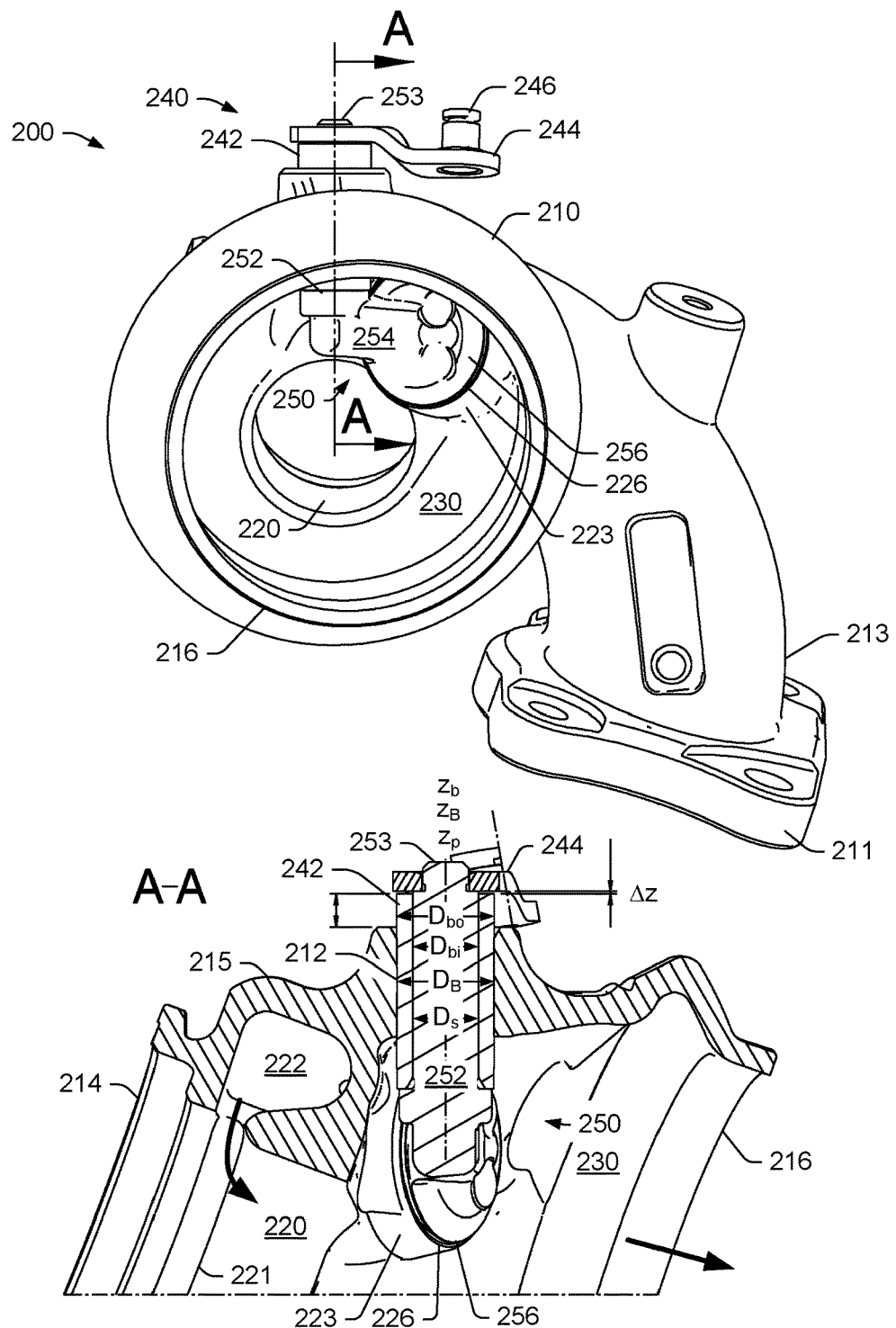
FIG. 2 is a series of view of an example of an assembly that includes a wastegate.

FIG. 2 shows an example of an assembly 200 that includes a turbine housing 210 that includes a flange 211, a bore 212, an inlet conduit 213, a turbine wheel opening 214, a spiral wall 215, an exhaust outlet opening 216, a shroud wall 220, a nozzle 221, a volute 222 formed in part by the spiral wall 215, a wastegate wall 223 that extends to a wastegate seat 226, and an exhaust chamber 230. In the example of FIG. 2, the turbine housing 210 may be a single piece or multi-piece housing. As an example, the turbine housing 210 may be a cast component (e.g., formed via a sand casting or another casting process). The turbine housing 210 includes various walls, which can define features such as the bore 212, the turbine wheel opening 214, the exhaust outlet opening 216, the chamber 230, etc. In particular, the wastegate wall 223 defines a wastegate passage in fluid communication with the inlet conduit 213 where a wastegate control linkage 240 and a wastegate arm and plug 250 are configured for opening and closing the wastegate passage (e.g., for wastegating exhaust).

In the example of FIG. 2, the wastegate control linkage 240 includes a bushing 242 configured for receipt by the bore 212 of the turbine housing 210, a control arm 244 and a peg 246 and the wastegate arm and plug 250 includes a shaft 252, a shaft end 253, an arm 254 and a plug 256. As shown, the bushing 242 is disposed between the bore 212 and the shaft 252, for example, to support rotation of the shaft 252, to seal the chamber 230 from an exterior space, etc. The bore 212, the bushing 242 and the shaft 252 may each be defined by a diameter or diameters as well as one or more lengths. For example, the shaft 252 includes a diameter $D_s$, the bore 212 includes a diameter $D_B$ while the bushing 242 includes an inner diameter $D_{bi}$ and an outer diameter $D_{bo}$. In the example of FIG. 2, when the various components are assembled, the diameters may be as follows: $D_B > D_{bo} > D_{bi} > D_s$. As to lengths, a length of the shaft 252 exceeds a length of the bushing 242, which exceeds a length of the bore 212. Such lengths may be defined with respect to a shaft axis $z_s$, a bushing axis $z_b$ and a bore axis $z_B$. As shown, the bushing 242 is disposed axially between a shoulder of the shaft 252 and the control arm 244 of the control linkage 240.

In the example of FIG. 2, a gap $\Delta z$ is shown between a surface of the bushing 242 and a surface of the control arm 244, which allows for axial movement of the shaft 252, for example, to facilitate self-centering of the plug 256 with respect to the wastegate seat 226.

As an example, the assembly 200 may be fitted to an exhaust conduit or other component of an internal combustion engine (see, e.g., examples of FIG. 1) via the flange 211 such that exhaust is received via the inlet conduit 213, directed to the volute 222. From the volute 222, exhaust is directed via the nozzle 221 to a turbine wheel disposed in the turbine housing 210 via the opening 214 to flow and expand in a turbine wheel space defined in part by the shroud wall 220. Exhaust can then exit the turbine wheel space by flowing to the chamber 230 and then out of the turbine housing 210 via the exhaust outlet opening 216.

As to wastegating, upon actuation of the control linkage 240 (e.g., by an actuator coupled to the peg 246), the wastegate arm and plug 250 may be rotated such that at least a portion of the received exhaust can flow in the wastegate passage defined by the wastegate wall 223, past the wastegate seat 226 and into the chamber 230, rather than through the nozzle 221 to the turbine wheel space. The wastegated portion of the exhaust may then exit the turbine housing 210 via the exhaust outlet opening 216 (e.g., and pass to an exhaust system of a vehicle, be recirculated in part, etc.).

As an example, the control linkage 240 may exert a force that acts to force the plug 256 in a direction toward the wastegate seat 226. For example, an actuator may include a biasing mechanism (e.g., a spring, etc.) that exerts force, which may be controllably overcome, at least in part, for rotating the plug 256 away from the wastegate seat 226 (e.g., for wastegating). As an example, an actuator may be mounted to a turbocharger (e.g., mounted to a compressor assembly, etc.). As an example, an actuator may be a linear actuator, for example, that includes a rod that moves along an axis. Depending on orientation of a plug, a shaft, a control linkage and such a rod, to maintain the plug in a closed position, the rod may exert a downward force (e.g., away from the control linkage as in the example of FIG. 2) or the rod may exert an upward force (e.g., toward the control linkage). For example, where the control arm 244 (e.g., and the peg 246) of the control linkage 240 are oriented on the same "side" as the plug 256 with respect to the shaft 252, a downward force applied to the control arm 244 (e.g., via the peg 246) may act to maintain the plug 256 in a closed position with respect to the wastegate seat 226; whereas, where, for example, an approximately 180 degree span exists between a plug and a control arm, an upward force applied to the control arm may act to maintain the plug in a closed position with respect to a wastegate seat.

As an example, a rod of an actuator may be biased to exert a force on a control linkage that causes the control linkage to exert a force on a plug (see, e.g., the plug 256) such that the plug seats against a wastegate seat (see, e.g., the wastegate seat 226). In such an example, the actuator may at least in part overcome the force that biases the rod such that a shaft rotates the plug away from the wastegate seat. For example, in FIG. 2, to initiate wastegating, the entire plug 256 rotates about an axis of the shaft 252 and moves away from the wastegate seat 226 (e.g., without any portion of the plug 256 moving into a wastegate opening defined by the wastegate seat 226). As an example, the moving away of the plug 256 may be facilitated by exhaust pressure. For example, in a closed position, the plug 256 experiences a pressure differential where pressure is higher below the plug 256 and less above the plug 256. In such an example, the pressure below the plug 256 acts in a direction that is countered by the closing force applied to the plug 256 via the control linkage 240 (e.g., the pressure differential acts to bias the plug 256 toward an open position). Accordingly, the closing force applied to the plug 256 should overcome pressure force from below the plug 256. Further, where the shaft 252 may include some play (see, e.g., $\Delta z$, etc.), the closing force applied to the plug 256 may cause the plug 256 to self-center with respect to the wastegate seat 226 (e.g., to facilitate sealing, to avoid exhaust leakage, etc.).

In the example of FIG. 2, the axes of the bore 212, the bushing 242 and the shaft 252 are shown as being aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

As an example, a plug may include a contact portion and an aerodynamic portion. For example, a plug may include a radiused portion as a contact portion that contacts a surface of a wastegate seat in a closed state and an aerodynamic portion that defines a flow passage with respect to the surface of the wastegate seat in an open state. In such an example, the aerodynamic portion may extend into a wastegate passage in the closed state (e.g., without contacting a surface that defines the wastegate passage, a surface of the wastegate seat, etc.). As an example, in an assembly, such a plug may be configured to self-center with respect to a wastegate seat (e.g., in a closed state). As an example, a surface of a wastegate seat may be conical, which may facilitate self-centering of a contact portion of a plug. As an example, one or more clearances may exist in an assembly for a wastegate shaft with respect to a bushing such that the wastegate shaft may move in a manner that allows for self-centering of a wastegate plug, operatively coupled to the wastegate shaft, with respect to a wastegate seat.

Figure 3:
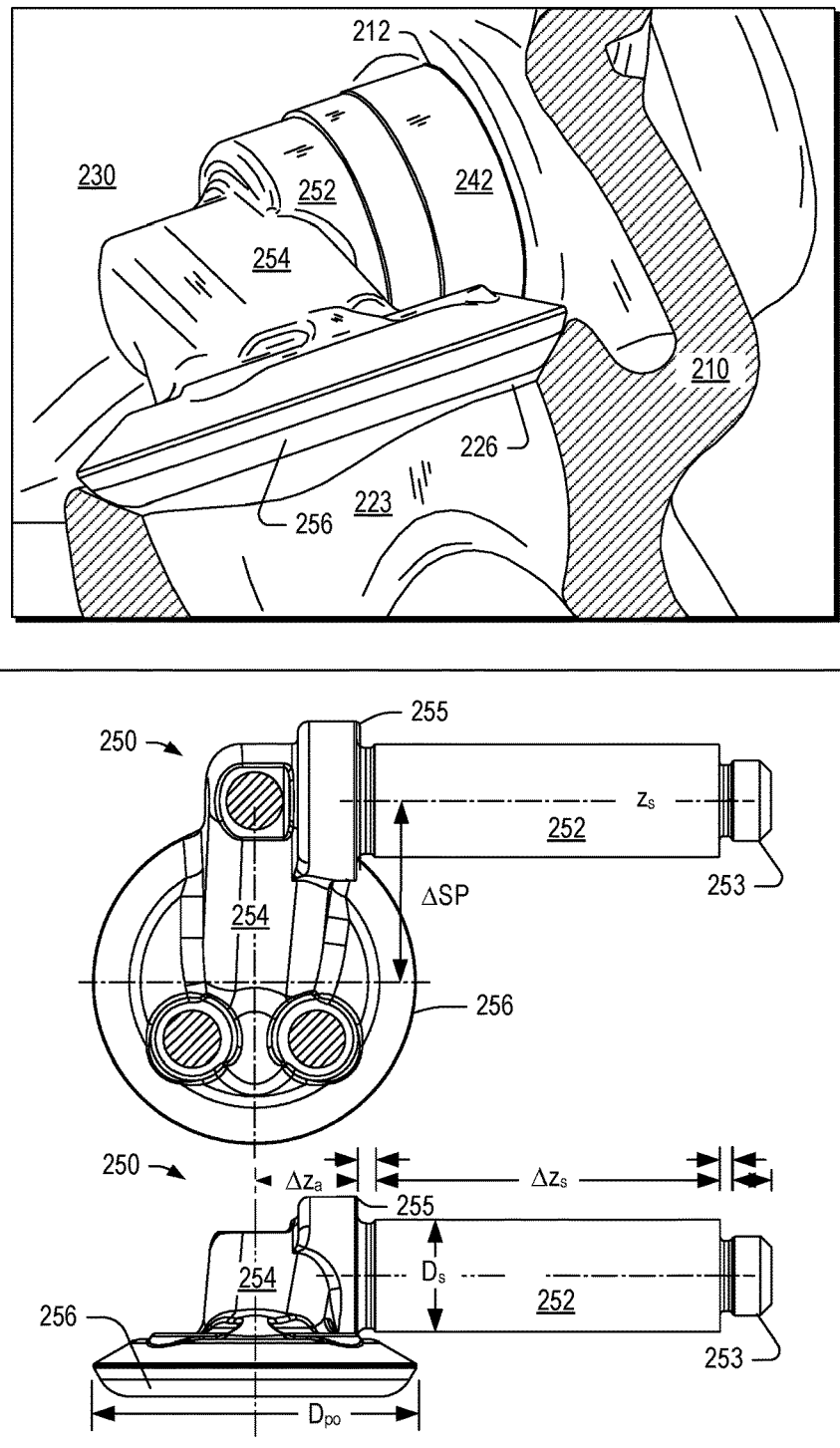
FIG. 3 is a series of views of an example of an assembly that includes a wastegate and views of an example of a wastegate.

FIG. 3 shows a view of a portion of the assembly 200 of FIG. 2 along with views of an example of the wastegate arm and plug 250. As described above, the wastegate arm and plug 250 can include a shaft 252, a shaft end 253, an arm 254 and a plug 256. As an example, the wastegate arm and plug 250 can be a monoblock wastegate arm and plug where monoblock refers to a component being made of a single unitary "block" (e.g., via machining of metallic stock or other process) or formed as a single unitary component (e.g., via casting or other process), which may be in a final or near final form. As an example, a shaft may be a component that is formed separately and fit to a monoblock component that includes an arm and a plug. In such an example, the shaft may be fit in a manner that physically prevents movement of the shaft separately from movement of the arm and the plug. As an example, a monoblock arm and plug and/or a monoblock shaft, arm and plug may be made of a material such as HK 30 alloy (e.g., C at 0.20-0.50; Cr at 24.0-27.0; Ni at 19.0-22.0; Si at 0.75-1.30; Mn at 1.50; Mo at 0.20-0.30; Fe at balance; and other optionally Nb at 1.00-1.75, noting values as weight percent).

In the example of FIG. 3, the wastegate arm and plug 250 includes a shoulder 255. Such a shoulder may define an axial face, which may be an annular axial face. As an example, the shoulder 255 may abut an end of the bushing 242. As an example, the shaft 252 may be considered to be of a length defined from the end of the shaft 253 to the shoulder 255 (see $\Delta z_s$) or may be considered to be of a length defined from the end of the shaft 253 to, for example, a centerline of the arm 254 (see $\Delta z_a$ and $\Delta z_s$). As shown in FIG. 3, a dimension $\Delta$SP can be a shaft-to-plug dimension where rotation of the shaft 252 about its longitudinal axis causes rotation of the plug 256 along an arc defined by a radius, which can be the dimension $\Delta$SP.

As implemented in an internal combustion engine application, some misalignment of components of a wastegate assembly may occur. In FIG. 3, the shaft 252 is shown as including an axis $z_s$ that may become misaligned with an axis $z_b$ of the bushing 242. For example, the bushing 242 may be received with minimal radial clearance with respect to the bore 212 of the housing 210 while a radial clearance may exist (e.g., a larger radial clearance) between the shaft 252 and an inner surface of the bushing 242. In such a manner, the shaft 252 may tilt with respect to the axis of the bushing 242 and, for example, the axis of the bore 212 ($z_B$). As an example, contact points may determine a maximal extent of misalignment with respect to tilting of the axis of the shaft 252 ($z_s$) with respect to the axis of the bushing 242 ($z_b$). As an example, such tilt may be represented by a tilt angle.

As an example, an axial gap $\Delta z$ can exist between an outwardly facing end of the bushing 242 disposed at an axial position and an inwardly facing surface of the control arm 244 disposed at an axial position. In such an example, the axial gap may be defined by the difference between these two axial positions. As an example, the shaft 252 may be able to move axially where the axial distance may be limited in part by the end of the bushing 242, which defines, in part, the axial gap Δz. For example, the inwardly facing surface of the control arm 244 may contact the end of the bushing 242, which, in turn, may limit axial inward movement of the shaft 252.

As mentioned, the shaft 252 may tilt and may move axially where such movements may be limited (e.g., axially via Δz). As an example, the wastegate arm and plug 250 may act to self-center with respect to the wastegate seat 226 responsive to force applied to the control arm 244 (e.g., which is transmitted to the wastegate arm and plug 250 via the shaft 252, whether integral therewith or operatively coupled thereto). In such an example, self-centering may occur for effective sealing of the wastegate within the range of clearances that allow for axial and/or angular movement of the shaft 252.

As an example, during operational use, one or more clearances between various components (e.g., plug, arm, shaft, bore, bushing, etc.) may change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it may be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

As an example, one or more pieces may be from a blank (e.g., a blank bar, stock, etc.). As an example, one or more pieces may be cast (e.g., from a molten material that can harden upon cooling). As an example, a material of construction of a piece may be a metal. As an example, a material of construction of a piece may be an alloy. As an example, a material (e.g., a metal, an alloy, etc.) may be selected based on operational conditions (e.g., operational conditions of an exhaust gas turbine) and, for example, ability to be welded to another piece. As an example, a unit may be formed of a high temperature metal and/or a high temperature alloy. As an example, a piece may be formed of an alloy such as, for example, a NiCrFe-based alloy (e.g., HASTALLOY™ material, INCONEL™ material, etc.) or another alloy. As an example, a piece may be formed of a stainless steel or another type of steel.

As an example, a weld may be formed between two or more components where the weld can withstand operating conditions (e.g., temperatures, etc.) of an exhaust gas turbine of a turbocharger operatively coupled to an internal combustion engine (e.g., gasoline, diesel, flex-fuel, bi-fuel, etc.).

As an example, a plug can include a shape such as, for example, a shape of a hemisphere (e.g., a substantially hemispherical shell plug, a substantially hemispherically solid plug, etc.). As an example, a plug can include a toroidal portion that defines a convex surface that can contact a wastegate seat. In such an example, the plug can include a protruding portion that may extend into a portion of a wastegate passage at least in part when the plug is in a closed orientation with respect to the wastegate passage, for example, where the convex surface contacts the wastegate seat. As an example, a plug can include a concave surface, which may be, for example, a domed concave surface that faces a wastegate passage. As an example, a concave surface may be interior to a convex surface that can contact a wastegate seat. As an example, a concave surface may act to distribute pressure. As an example, a convex surface that can extend into a wastegate passage may act to distribute pressure in a different manner. For example, where exhaust flows and impinges upon the convex surface, one or more stagnation points may form that may also coincide with pressure or force points where pressure or force may be at a global maximum or local maxima on a plug with respect to exhaust flow.

Figure 4:
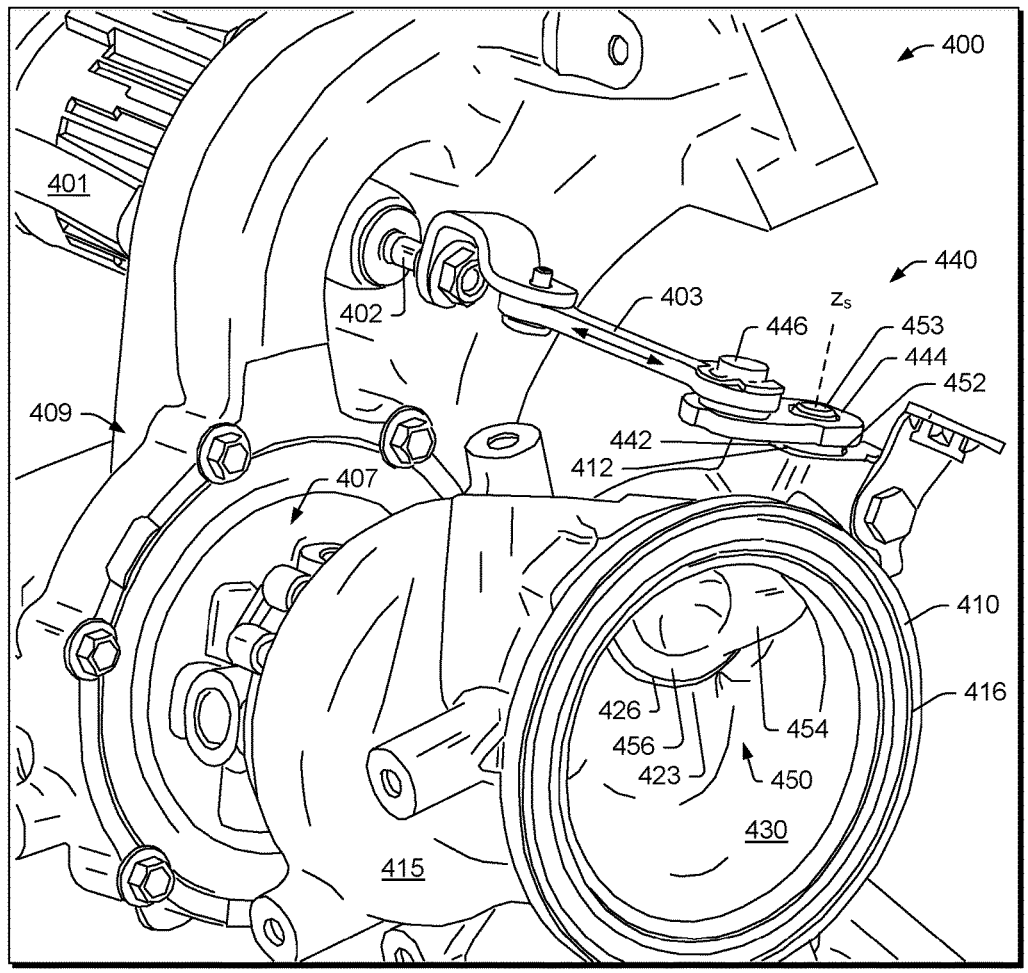
FIG. 4 is a perspective view of an example of a turbocharger.

FIG. 4 shows an example of an assembly 400 that includes an actuator 401, an actuation rod 402, an actuator linkage 403, a center housing 407 (e.g., to house a bearing, bearings, etc. for a turbocharger shaft, etc.), a compressor housing 409, a turbine housing 410 that includes a bore 412, a spiral wall 415 (e.g., that defines, in part, a volute), an exhaust outlet opening 416, a wastegate wall 423 that extends to a wastegate seat 426, and an exhaust chamber 430.

In the example of FIG. 4, the turbine housing 410 may be a single piece or multi-piece housing. As an example, the turbine housing 410 may be a cast component (e.g., formed via sand casting or other casting process). As shown, the turbine housing 410 includes various walls, which can define features such as the bore 412, a turbine wheel opening, an exhaust outlet opening, the chamber 430, etc. In particular, the wastegate wall 423 defines a wastegate passage in fluid communication with an inlet conduit where a wastegate control linkage 440 and a wastegate shaft, arm and plug unit 450 are configured for opening and closing the wastegate passage (e.g., for wastegating exhaust).

In the example of FIG. 4, the wastegate control linkage 440 includes a bushing 442 configured for receipt by the bore 412 of the turbine housing 410, a control arm 444 and a peg 446 and the wastegate shaft, arm and plug unit 450 includes a shaft 452, a shaft end 453, an arm 454 and a plug 456. As shown, the bushing 442 is disposed between the bore 412 and the shaft 452, for example, to support rotation of the shaft 452, to seal the chamber 430 from an exterior space, etc. The bore 412, the bushing 442 and the shaft 452 may each be defined by a diameter or diameters as well as one or more lengths.

As an example, the assembly 400 may be fitted to an exhaust conduit or other component of an internal combustion engine (see, e.g., examples of FIG. 1) via a flange such that exhaust is received via an inlet conduit that may direct exhaust to a volute (e.g., or volutes) that may be defined at least in part by the spiral wall 415. As an example, a volute (e.g., or volutes) may direct exhaust (e.g., via a nozzle or nozzles) to a turbine wheel disposed in the turbine housing 410 where the exhaust may flow and expand in a turbine wheel space defined in part by the turbine housing 410. Exhaust may then exit the turbine wheel space by flowing to the chamber 430 and then out of the turbine housing 410 via the exhaust outlet opening 416.

As to wastegating, upon actuation of the control linkage 440 (e.g., by the actuator linkage 403 being operatively coupled to the peg 446), the wastegate shaft, arm and plug unit 450 may be rotated such that at least a portion of the received exhaust can flow in the wastegate passage defined by the wastegate wall 423, past the wastegate seat 426 and into the chamber 430, rather than through a nozzle to a turbine wheel space. The wastegated portion of the exhaust may then exit the turbine housing 410 via the exhaust outlet opening 416 (e.g., and pass to an exhaust system of a vehicle, be recirculated in part, etc.).

As an example, the control linkage 440 may exert a force that acts to force the plug 456 in a direction toward the wastegate seat 426. For example, the actuator 401 may include a biasing mechanism (e.g., a spring, etc.) that exerts force, which may be controllably overcome, at least in part, for rotating the plug 456 away from the wastegate seat 426 (e.g., for wastegating). As an example, the actuator 401 may be mounted to the assembly 400. As an example, the actuator 401 may be a linear actuator, for example, for moving the rod 402 along an axis. Depending on orientation of a plug, a shaft, a control linkage and such a rod, to maintain the plug in a closed position, the rod may exert a downward force (e.g., away from the control linkage as in the example of FIG. 4) or the rod may exert an upward force (e.g., toward the control linkage). For example, where the control arm 444 (e.g., and the peg 446) of the control linkage 440 are oriented on the same "side" as the plug 456 with respect to the shaft 452, a downward force applied to the control arm 444 (e.g., via the peg 446) may act to maintain the plug 456 in a closed position with respect to the wastegate seat 426; whereas, where, for example, an approximately 180 degree span exists between a plug and a control arm, an upward force applied to the control arm may act to maintain the plug in a closed position with respect to a wastegate seat.

As an example, the rod 402 of the actuator 401 may be biased to exert a force on the control linkage 440 that causes the control linkage 440 to exert a force on the plug 456 such that the plug 456 seats against the wastegate seat 426. In such an example, the actuator 401 may at least in part overcome the force that biases the rod 402 such that the shaft 452 rotates the plug 456 away from the wastegate seat. For example, in FIG. 4, to initiate wastegating, the entire plug 456 rotates about an axis of the shaft 452 and moves away from the wastegate seat 426 (e.g., without any portion of the plug 456 moving into a wastegate opening defined by the wastegate seat 426). As an example, the moving away of the plug 456 may be facilitated by exhaust pressure. For example, in a closed position, the plug 456 experiences a pressure differential where pressure is higher below the plug 456 and less above the plug 456. In such an example, the pressure below the plug 456 acts in a direction that is countered by the closing force applied to the plug 456 via the control linkage 440 (e.g., the pressure differential acts to bias the plug 456 toward an open position). Accordingly, the closing force applied to the plug 456 should overcome pressure force from below the plug 456. Further, where the shaft 452 may include some play (e.g., axial play, etc.), the closing force applied to the plug 456 may cause the plug 456 to move with respect to the wastegate seat 426.

As an example, a method can include in situ welding of a wastegate that includes a shaft, an arm and a plug. In such an example, the wastegate can be a monoblock wastegate where at least the arm and plug are a unitary piece. In such an example, the monoblock wastegate can be a single component that includes a shaft, an arm and a plug, which may be defined by dimensions. Such dimensions may limit orientation of the monoblock wastegate with respect to a turbine housing that includes a bore that can receive the shaft and that includes a wastegate seat that can seat the plug to cover a wastegate passage.

As an example, a monoblock wastegate arm and plug can provide various benefits when compared to a three piece arm and plug design in terms of durability and impact on noise generated by system kinematics.

As mentioned, a plug can include a convex surface that may be, for example, a portion of a sphere or a portion of a torus. Such a convex surface may be considered to be a contact surface or a sealing surface that can contact a wastegate seat in a closed orientation to obstruct a wastegate passage. As an example, a wastegate seat may be defined at least in part by a portion of a cone. For example, a wastegate seat can be a conical wastegate seat. In such an example, a convex surface of a plug may self-center with respect to the wastegate seat, for example, due in part to force applied to the plug via a shaft and an arm.

As an example, a method can include in situ connecting of components, for example, via welding. In such an example, the method can include applying force to a plug to seat it with respect to a wastegate seat. For example, a tool (e.g., a rod, a jig, etc.) may be used to apply force to a plug to seat it with respect to a wastegate seat. Such an approach may act to apply force to substantially center a plug with respect to a wastegate seat where, for example, welding may be performed to connect components while the plug is substantially centered. As an example, application of force may act to reduce axial play of an assembly.

Figure 5:
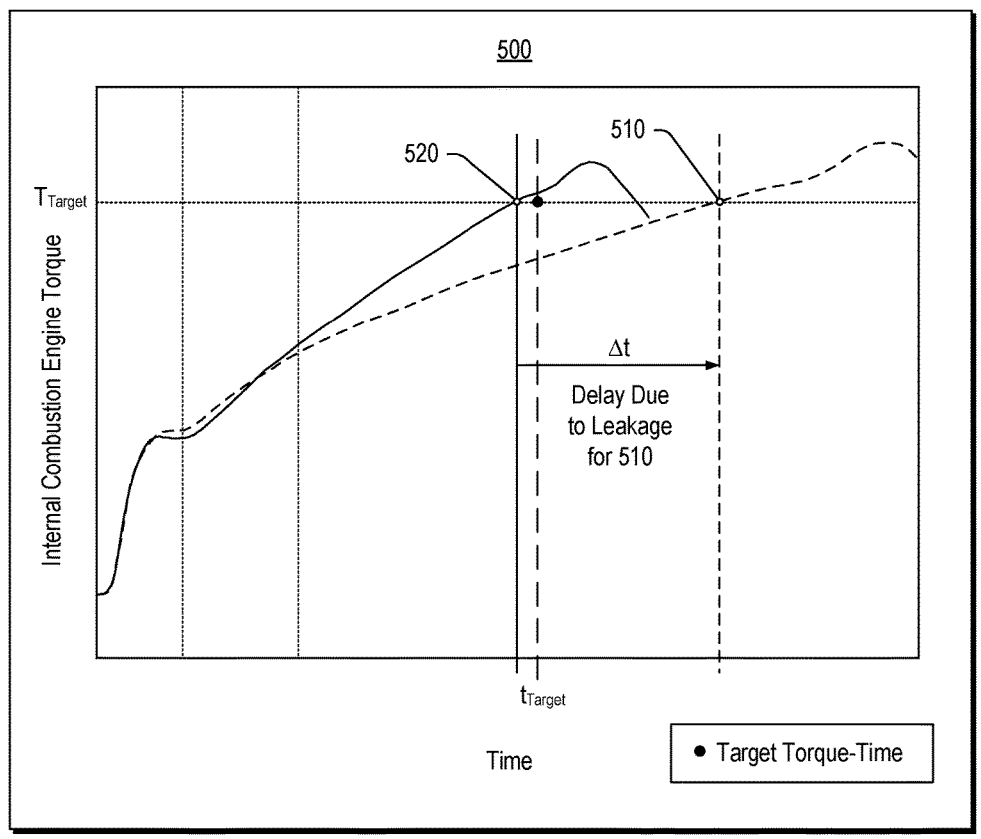
FIG. 5 is an example of a plot of data.

FIG. 5 shows an example plot 500 of torque generated by an internal combustion engine versus time with respect to two different wastegate assemblies 510 and 520. As shown, the wastegate assembly 520 can operate in a manner that decreases time for an internal combustion engine to achieve a level of torque (e.g., a torque target, $T_{Target}$) when compared to the wastegate assembly 510, which exhibits some leakage. As to the lesser time, the wastegate assembly 520 is assembled using a shimming approach. Such an approach allows for achieving a desired level of torque in a lesser time than the assembly 510 where the desired level of torque is achieved within a target time (see, e.g., $t_{Target}$) due to adequate sealing of a wastegate passage (e.g., a plug portion seated against a wastegate seat to close a wastegate passage). In the example plot 500, the profiles of torque versus time correspond to a change of in operational conditions associated with an amount of exhaust pressure. The example plot 500 demonstrates how a method of manufacture can achieve desired clearances of an assembly that includes a monoblock arm and plug such that a desired amount of sealing is exhibited in operation of a turbocharged internal combustion engine. Such an assembly may be less prone to wear, rattling (e.g., noise), performance degradation over time when compared to an assembly that includes an arm and a plug as separate pieces. As an example, a monoblock arm and plug approach can include a torus as part of a plug and a cone as part of a wastegate seat, for example, in contrast to a flat surface plug and a flat surface wastegate seat.

Figure 6:
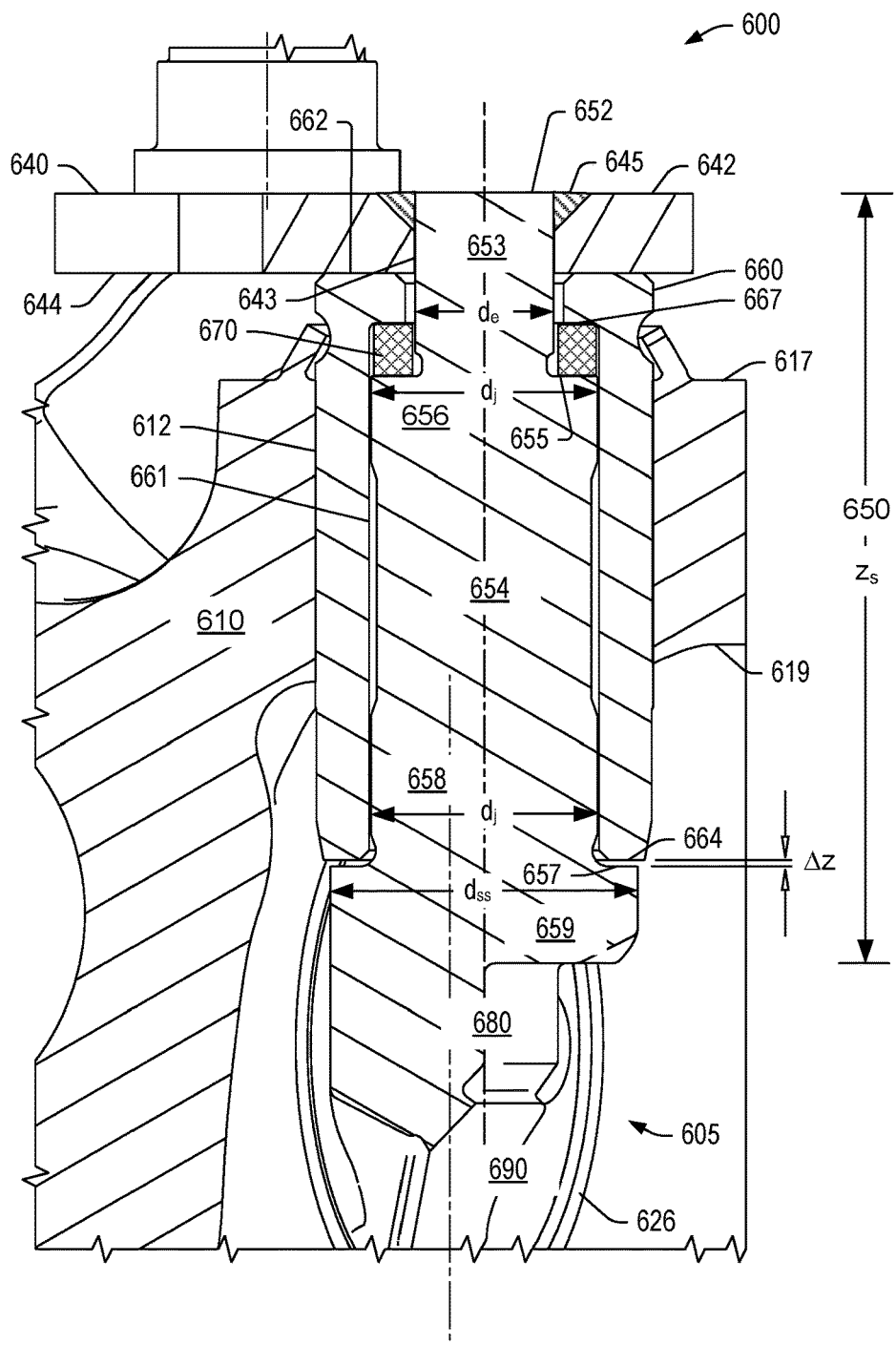
FIG. 6 is a cut-away view of an example of an assembly.

FIG. 6 is a cut-away view of an example of an assembly 600 that includes a wastegate 605, a turbine housing 610, a control arm 640, a bushing 660, and a mesh spacer 670. Such an assembly can be a turbocharger turbine wastegate assembly, which can be part of a turbocharger turbine housing assembly. For example, the turbine housing 610 can include various features such that it carries, accommodates, etc., the wastegate 605 and associated components. As an example, a turbocharger turbine wastegate assembly can be an assembly that attaches to one or more housing of a turbocharger.

As shown in FIG. 6, the wastegate 605 includes a shaft 650, an arm 680 and a plug 690 where the shaft 650 includes an end 652, an end portion 653, a journal portion 654 with one or more journals 656 and 658, and a shoulder portion 659 where a first axial face 655 is defined at least in part by an end portion diameter ($d_e$) and a journal portion diameter ($d_j$) and where a second axial face 657 is defined at least in part by the journal portion diameter ($d_j$) and a shoulder portion diameter ($d_{ss}$). As shown, the journal portion 654 can include one or more journal surfaces as associated with the journals 656 and 658.

As shown in FIG. 6, the turbine housing 610 includes a bore 612, an exterior surface 617 and an interior surface 619 where the bore 612 extends between the exterior surface 617 and the interior surface 619. The turbine housing 610 also includes a wastegate seat 626 that is defined along the interior surface 619. In the example of FIG. 6, the plug 690 is seated in the wastegate seat 626 (e.g., a surface of the plug 690 contacts a surface of the wastegate seat 626).

As shown in FIG. 6, the control arm 640 includes opposing surfaces 642 and 644 and a bore 643 that extends between the opposing surfaces 642 and 644. In the example of FIG. 6, a weld 645 fixes the control arm 640 to the end portion 653 of the shaft 650 of the wastegate 605. In such an arrangement, at least a portion of the end portion 653 is received by the bore 643 of the control arm 640; noting that one or more other arrangements may be utilized to fix the control arm 640 to the shaft 650 of the wastegate 605.

As shown in FIG. 6, the bushing 660 includes a stepped bore 661 that extends between opposing ends 662 and 664, which can be axial faces. For example, the end 662 can be an axial face about a smaller diameter portion of the stepped bore 661 and the end 664 can be an axial face about a larger diameter portion of the stepped bore 661. As shown in FIG. 6, an axial face 667 is located between the ends 662 and 664 and within the stepped bore 661. The axial face 667 can be a shoulder such as a shoulder of a counter-bore that is formed between the two portions of the stepped bore 661.

As shown in the example of FIG. 6, the assembly 600 includes: the turbine housing 610 that includes the exterior surface 617, the interior surface 619 that includes the wastegate seat 626, and the bore 612 that extends between the exterior surface 617 and the interior surface 619; the bushing 660 disposed at least partially in the bore 612 of the turbine housing 610 where the bushing 660 includes the stepped bore 661 that includes the axial face 667; the wastegate 605 that includes the shaft 650, the arm 680 and the plug 690, where the arm 680 extends from the shaft 650 and the plug 690 extends from the arm 680, where the shaft 650 includes the end portion 653, the first axial face 655, the journal portion 654, the second axial face 657 and the shoulder portion 659, where the first axial face 655 is defined at least in part by the end portion diameter ($d_e$) and the journal portion diameter ($d_j$), and where the second axial face 657 is defined at least in part by the journal portion diameter ($d_j$) and the shoulder portion diameter ($d_{ss}$); the mesh spacer 670 disposed radially about an axial length of the end portion 653 of the shaft 650 between the axial face 667 of the stepped bore 661 of the bushing 660 and the first axial face 655 of the shaft 650; and the control arm 640 connected to the end portion 653 of the shaft 650 where an axial length of the bushing 660 is disposed between the mesh spacer 670 and the control arm 640.

In the example of FIG. 6, the shaft 650 can be defined by an axial length ($z_s$), for example, as measured from the end 652 to a surface of the shoulder portion 659 where the shaft 650 transitions to the arm 680. Another axial length of the shaft 650 can be measured from the end 652 to the second axial face 657. Yet another axial length of the shaft 650 can be measured from the first axial face 655 to the second axial face 657.

As shown in FIG. 6, an axial gap ($\Delta z$) can exist between the end 664 of the bushing 660 and the second axial face 657 of the shaft 650. As an example, the axial gap ($\Delta z$) may be an adjustable parameter. For example, the axial gap ($\Delta z$) may be set during assembly from a distance of approximately 0 to approximately 1 mm or less (e.g., consider a range from approximately 0.01 mm to approximately 0.5 mm). As an example, the axial gap ($\Delta z$) may be non-existent where the end 664 of the bushing 660 contacts the second axial face 657 of the shaft 650. As an example, one or more dimensions of the mesh spacer 670 may be selected to determine whether the axial gap ($\Delta z$) exists and/or, for example, a size of the axial gap ($\Delta z$). As an example, an axial gap ($\Delta z$) may exist depending on a manner in which the plug 690 seats in the wastegate seat 626. For example, where force is applied to the plug 690 of the wastegate 605, an axial gap may be formed or not. In such an example, the plug 690 can include a surface profile such as a toroidal surface profile that contacts a surface profile of the wastegate seat 626 such as a conical profile.

In the example of FIG. 6, the surface 644 of the control arm 640 may be positioned with respect to the end 662 of the bushing 660 (e.g., an end surface of the bushing 660). In such an example, the surface 644 may contact the end 662, for example, during formation of the weld 645. In such an example, the surface 644 and the end 662 may be at zero clearance. Where the mesh spacer 670 is compressed axially from a free standing state, the mesh spacer 670 can exert a force that biases the shaft 650 axially inwardly in a direction toward the interior space. Such a force may be referred to as a load where the shaft 650 is loaded with respect to the bushing 660. At a time of assembly (e.g., formation of the weld 645), such a load may be referred to as a preload. Such an approach may help to reduce an amount of dynamic axial movement of the control arm 640 that may cause a clearance to form between the surface 644 and the end 662, upon which reduction of the clearance and contact between the surface 644 and the end 662 may cause undesirable noise. As an example, axial movement as associated with temperature (e.g., thermal expansion) may occur. For example, where the shaft 650 expands axially responsive to an increase in temperature (e.g., according to a coefficient of thermal expansion), the rate of expansion may be relatively less than a rate of movement (e.g., dynamic axial movement) that occurs responsive to a change in an operational condition (e.g., exhaust pulse, controller action, vehicle vibration, etc.).

As an example, an amount of preload may help to maintain a clearance (e.g., the axial gap ($\Delta z$)), if desired, between the end 664 of the bushing 660 the second axial face 657 of the shaft 650. Such a preload, or load during operation, may help to reduce dynamic axial movement that may cause contact between the end 664 and the second axial face 657, which may generate undesirable noise. As an example, at a time of assembly, a clearance may be referred to as a residual clearance (e.g., a residual axial gap), which may be expected to be within a range of tolerances; noting that during operation, such a clearance may change responsive to one or more operational conditions. Such a clearance may allow for proper seating of the plug 690 on the wastegate seat 626 such that the wastegate 605 operates optimally (e.g., with no, reduced or minimal leakage of exhaust, etc.). A residual clearance (e.g., a residual axial gap), if and as desired, can correspond to a state of the plug 690 with respect to the wastegate seat 626 at a time of fixation of the control arm 640 to the shaft 650, which can correspond to an amount of preload imparted by the mesh spacer 670. For example, force may be applied to the wastegate 605 such that the plug 690 seats properly with respect to the wastegate seat 626 to achieve a desired static state where fixation of the control arm 640 to the shaft 650 occurs in that desired static state (e.g., with corresponding positions of components and mesh spacer preload).

The assembly 600 of FIG. 6 can utilize the mesh space 670 to properly position the wastegate 605, which may be a monoblock wastegate (e.g., flapper valve), into the wastegate seat 626 through flexibility of the mesh spacer 670 during the assembly process. As an example, the mesh space 670 can compensate part-to-part variation of dimensions and help assure adequate sealing. During operational life-time of a turbocharger, the mesh space 670 can help to maintain a defined position (e.g., via imparting a preload, load, etc.). The mesh spacer 670 can be a metal mesh spacer that is formed of deformable metal wire, deformable metal foam, etc. (e.g., consider a metal and/or an alloy mesh). The mesh spacer 670 can be made of a material that can withstand temperatures up to approximately 800 degrees C. Such a mesh spacer can be flexible up to such temperatures such that the mesh spacer can impart a biasing force within an assembly. For example, the mesh spacer 670 can impart a load (e.g., force) or biasing force upon assembly (e.g., preload) and during operation (e.g., operational load). As an example, the mesh spacer 670 can be an anti-sticking mechanism that acts to reduce sticking of the wastegate 605. For example, the flexibility of the mesh spacer 670 may allow for relatively small amounts of movement as may occur in response to rotation of the shaft 650 in the bore 612 of the housing 610, in response to temperature changes (e.g., noting different materials can exhibit different thermal coefficients of expansion, etc.), and/or in response to one or more other conditions. The mesh spacer 670 can help to reduce undesirable vibration and, for example, noise. Such reductions in undesirable behavior can enhance controllability and operational life-time. As an example, the mesh spacer 670 can operate as a damper that acts to damp various types of motion (e.g., to damp axial movement of the shaft 650 axially outwardly toward the exterior space, to damp axial tilting movement of the shaft 650 in the bushing 660, etc.).

As an example, the mesh spacer 670 can operate as a hindrance to flow of exhaust. In such an example, as the mesh spacer 670 compresses, its porosity (e.g., free space) can decrease and make a more tortuous path(es) as to flow of exhaust. Such an approach can help to reduce leakage of exhaust from an interior space of the turbine housing 610 to an exterior space (e.g., ambient space, environment, etc.). A reduction in leakage of exhaust can improve environmental performance.

As an example, the mesh spacer 670 can be positioned without fixation. For example, the mesh spacer 670 can be included in the assembly 600 without welding of the mesh spacer 670 to one or more other components. In such an example, the mesh spacer 670 may be referred to as a floating mesh spacer as it can move responsive to forces without being physically fixed to one or more other components. As an example, the mesh spacer 670 may be serviceable. For example, where the mesh spacer 670 is a floating mesh spacer, it may be removed without having to unfix it from one or more other components of the assembly 600, which may be required where a mesh spacer is welded or otherwise fixed to one or more other components of an assembly.

As an example, the mesh spacer 670 can be made of a material such as stainless steel or INCONEL® alloy. As an example, during operation, the shaft 650 may rotation a number of degrees. For example, consider a controller that is operatively coupled to the control arm 640 that can rotate the shaft 650 by approximately 60 degrees or less (e.g., consider a maximum rotation of approximately 45 degrees).

As an example, a controller may cause the shaft 650 to rotate at a rotational rate in degrees per unit time (e.g., or radians per unit time). For example, consider a rotational rate of approximately 100 degrees per second or less (e.g., consider a rotational rate of approximately 50 degrees per second). As an example, during operation of a turbocharger that includes the assembly 600, the mesh spacer 670 may experience an amount of deformation. As to an axial deformation, consider an amount of deformation of the order of approximately 2 mm or less, of the order of approximately 1 mm, etc. For example, consider an assembly that includes an estimated mesh spacer deformation of approximately 0.5 mm axially. As an example, an estimated mesh spacer deformation, which may be a design/assembly parameter, may depend on whether an axial gap is utilized or not (see, e.g., the axial gap $\Delta z$). Where no axial gap exists, a mesh spacer may impart a load while not experiencing a substantially amount of axial deformation. As an example, a mesh spacer may impart a load (e.g., a biasing force) that may act to stabilize a shaft axially (e.g., with respect to an axis of a stepped bore of a bushing in which a portion of the shaft is disposed).

As an example, a mesh spacer may be selected based on stiffness. For example, an amount of wire, a diameter of wire, a winding form of wire, etc. may determine stiffness. Stiffness can define rigidity of a mesh spacer as to the extent to which the mesh spacer resists deformation in response to an applied force. As an example, a spring constant may be utilized to characterize a mesh spacer.

Figure 7:
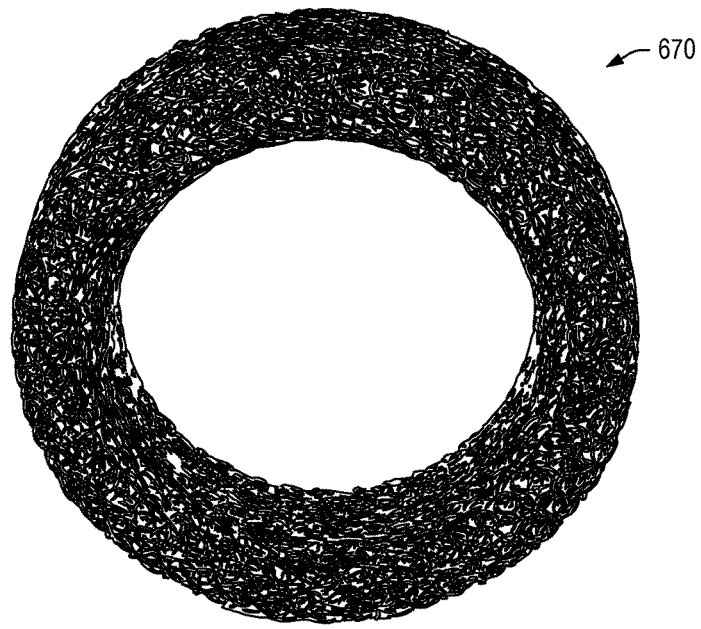
FIG. 7 is a series of views of examples of mesh spacers.
Figure 7:
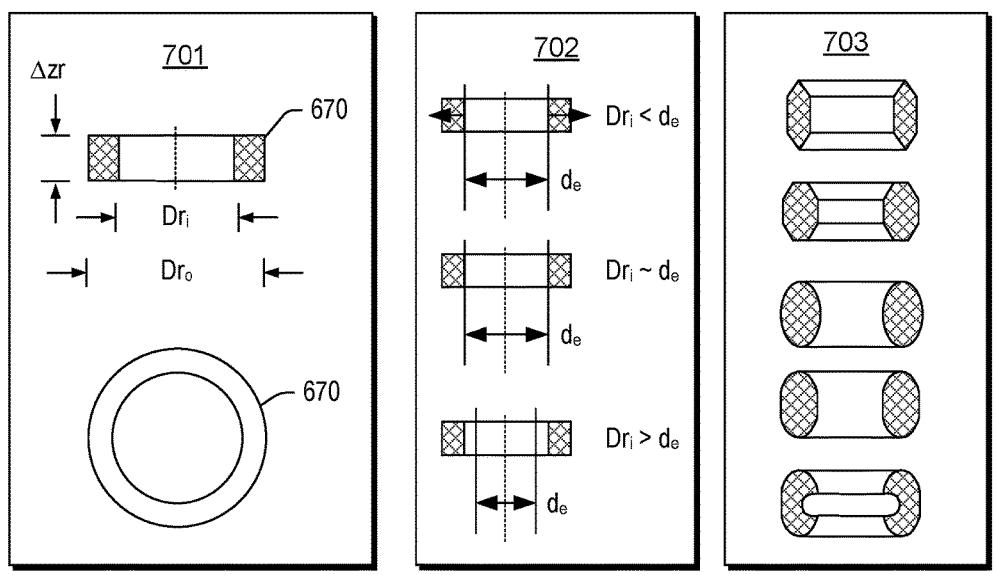

FIG. 7 is a series of views of examples of mesh spacers 670, 701, 702 and 703. The mesh spacer 670 may be made from compressing wire. As an example, the mesh spacer 670 may be resilient to a predetermined extent (e.g., a resilient mesh spacer). For example, the mesh spacer 670 may have a first shape and absorb energy when loaded with force with a corresponding change in the first shape to a second shape and then return to the first shape after unloading of the force. As an example, the mesh spacer 670 may be characterized in part by a compressibility, which may optionally be approximately zero or may be of a value akin to a spring constant where force can compress the mesh spacer 670 in its axial dimension, however, a limited amount that may be predetermined and that may be non-linear with respect to force. For example, a mesh spacer may be defined in part by an uncompressed axial length in an uncompressed state and a compressed axial length in a compressed state. During operation of a turbocharger, a mesh spacer may be of an axial length that is in a range between the uncompressed axial length and the compressed axial length. As an example, the difference between these two lengths may be an axial distance that is, for example, less than 1 mm, for example, less than about 0.5 mm, for example, less than about 0.1 mm or, for example, less than about 0.05 mm. As an example, a mesh spacer may be characterized at least in part by a Poisson ratio that defines transverse strain to axial strain. For example, upon compression in an axial direction, a mesh spacer may expand in a transverse direction.

As an example, a mesh spacer may be a resilient ring shaped mesh spacer that includes a pre-determined uncompressed operational axial length and a predetermined compressed operational axial length where a difference between the axial lengths is less than a specified axial distance.

As an example, a mesh spacer may be constructed of compressed wire such that surface of a side of the mesh spacer is reduced (e.g., contact surface) in comparison to a solid spacer. In such an example, friction may be reduced when compared to a solid spacer. As an example, where a mesh spacer is resilient, the mesh spacer may act to absorb energy such as axial thrust energy associated with axial movement of a shaft. In such an example, the mesh spacer may help to damp energy and reduce wear of one or more components of an assembly.

As an example, a mesh spacer can form a tortuous path for passage of gas (e.g., exhaust gas). For example, a mesh spacer may form one or more tortuous paths that can act to hinder passage of gas. In such an example, where a mesh spacer is compressible, the paths may be altered and, for example, hinder gas flow to a greater extent when compressed. As mentioned, a mesh spacer may be characterized at least in part by a Poisson's ratio (e.g., Poisson effect) where an amount of axial compression or expansion corresponds to an amount of radial expansion or compression, respectively. As an example, a mesh spacer may be made of metal, alloy, carbon fiber, ceramic, or a composite material. As an example, a material of construction and/or a shape of a mesh spacer may determine a Poisson's ratio. For example, a mesh spacer may have a Poisson's ratio determined by the shape of the mesh spacer and, for example, how the mesh spacer was constructed (e.g., amount of wire, compression force to form the mesh ring, etc.).

In the example of FIG. 7, the mesh spacer 670 can be a metallic ring (e.g., metal, alloy), a ceramic ring or a composite material ring. As an example, a mesh spacer can be metallic and formed of a self-lubricating steel (e.g., low friction steel alloys). As an example, a bushing may be formed of a metal or an alloy. As an example, a bushing can be made of a self-lubricating steel. As an example, a part (e.g., a mesh spacer, a bushing, etc.) may be cast and/or sintered. As an example, a turbine housing may be made of metal or alloy. As an example, a turbine housing may be a cast iron or a cast stainless steel. As an example, a wastegate seat may be machined, for example, to achieve a desired finish.

FIG. 7 shows various examples of dimensions 701 with respect to the mesh spacer 670, which can include axial and radial dimensions. FIG. 7 shows various examples of sizes of a mesh spacer with respect to a shaft dimension such as the dimension $d_e$ of the end portion 653 of the shaft 650.

FIG. 7 shows various examples of cross-sectional profiles of a mesh spacer. As shown, a cross-sectional profile can include straight and/or curved perimeter portions. As mentioned, shape of a mesh spacer can influence behavior of a mesh spacer (e.g., static behavior and/or dynamic behavior). As an example, shape and/or size of a mesh spacer may be utilized as parameters that can determine behavior of a mesh spacer. For example, consider shaping a mesh spacer to achieve a desired force versus axial length relationship. In such an example, a mesh spacer may have a smaller cross-sectional area near one or more of its axial faces such that less material is compressed and, correspondingly, less change in force occurs; whereas, as further axial compression occurs, the cross-sectional area increases such that more material is compressed and, corresponding, a greater change in force occurs. In such an example, the mesh spacer can become stiffer responsive to axial compression in a desired manner. As another example, consider a mesh spacer with a neck, which may be between two opposing axial end portions. In such an example, the neck may be of a lesser cross-sectional area such that axial compression of the neck occurs prior to any substantial amount of axial compression of the axial end portions. In such an example, upon compression of the neck, further compression may occur via one or both of the axial end portions, which are of greater cross-sectional area. In FIG. 7, an example of a mesh spacer with a neck and axial end portions is shown as the lowermost of the examples 703. Such a mesh spacer may provide a customized stiffness curve via one or more features (e.g., shape, shapes, size, sizes, etc.).

Figure 8:
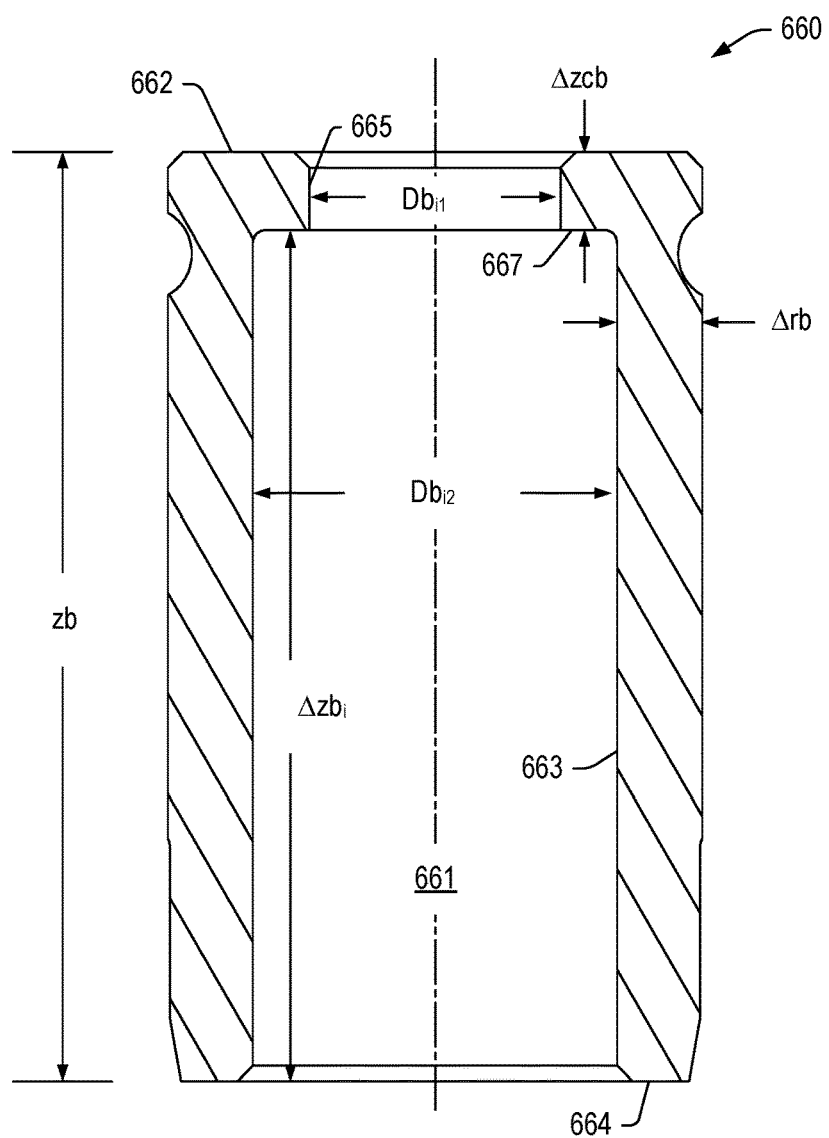
FIG. 8 is a cross-sectional view of an example of a bushing.

FIG. 8 is a cross-sectional view of the bushing 660 along with various dimensions. As shown, the stepped bore 661 includes a bore surface 663 disposed at a diameter $Db_{i2}$ and a bore surface 665 disposed at a diameter $D_{bi1}$. The axial face 667 may be an annular axial face that has an inner dimension approximately that of the diameter of the bore surface 665 and that has an outer dimension approximately that of the diameter of the bore surface 663.

Figure 9:
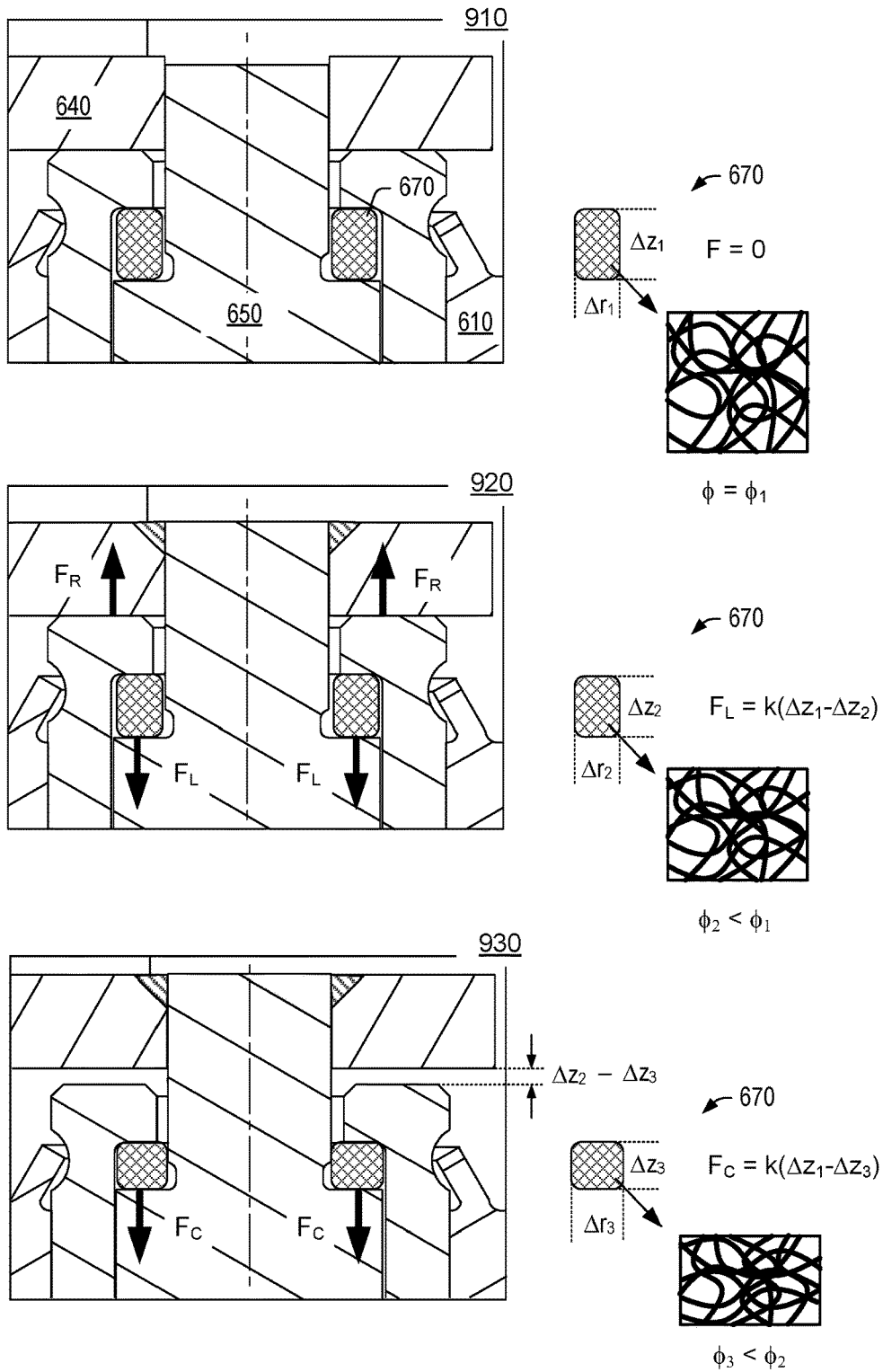
FIG. 9 is a series of views of an example of a mesh spacer in different states.

FIG. 9 is a series of views of an example of the mesh spacer 670 in different states 910, 920 and 930. As shown, the state 910 may be considered to be an uncompressed state, the state 920 may be considered to be an assembled state where an amount of load is imparted and the state 930 may be considered to be an operational state where an operational force causes the mesh spacer 670 to compress (e.g., axially) compared to the state 920.

As shown in FIG. 9, the porosity of the mesh spacer 670 can change in a state dependent manner. For example, the porosity of the mesh spacer 670 can decrease in moving from the state 910 to the state 920 to the state 930. In such a progression (e.g., from the state 920 to the state 930), tortuosity of a path or paths of potential exhaust leakage can decrease.

In the state 920, a reaction force ($F_R$) is shown as being imparted to the control arm 640, which is responsive to force (e.g., load $F_L$) imparted by compression of the mesh spacer 670. As shown in FIG. 7, a Poisson ratio may be defined for the mesh spacer 670. Such deformation may help to reduce leakage of exhaust and/or to help center the shaft 650 with respect to the bushing 660. In the state 930, a compression force ($F_C$) is shown.

FIGS. 10, 11, 12, 13 and 14 can be part of an example of a method that can assemble various components to form an assembly such as the assembly 600 of FIG. 6. For example, a method can be performed according to assemblies 1000 of FIG. 10, 1100 of FIG. 11, 1200 of FIG. 12, 1300 of FIG. 13 and 1400 of FIG. 14.

Figure 10:
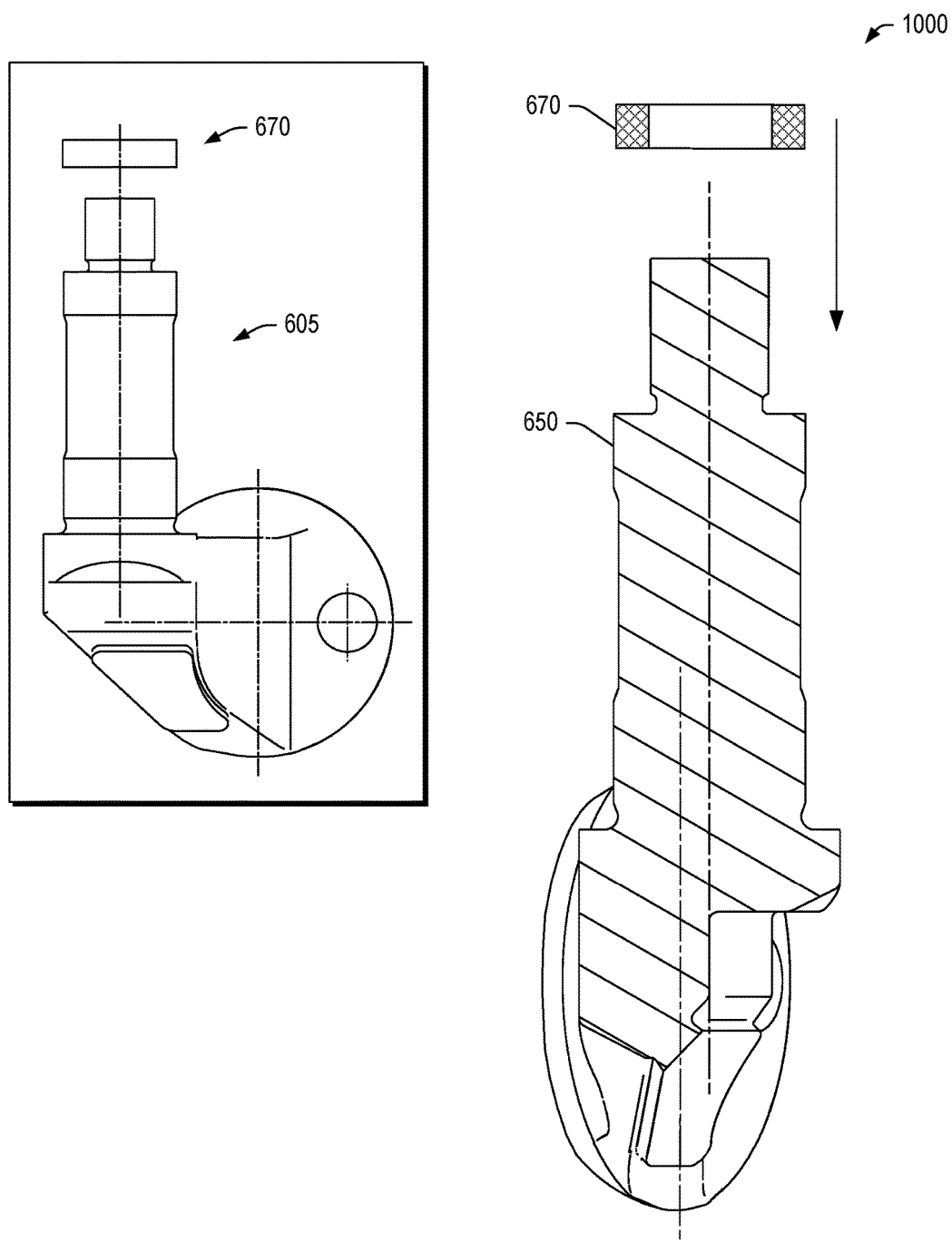
FIG. 10 is a plan view and a cut-away view of an example of a wastegate and an example of a mesh spacer as part of an example assembly.

As shown in FIG. 10, the assembly 1000 includes the wastegate 605 and the mesh spacer 670, which can be positioned on the wastegate 605.

Figure 11:
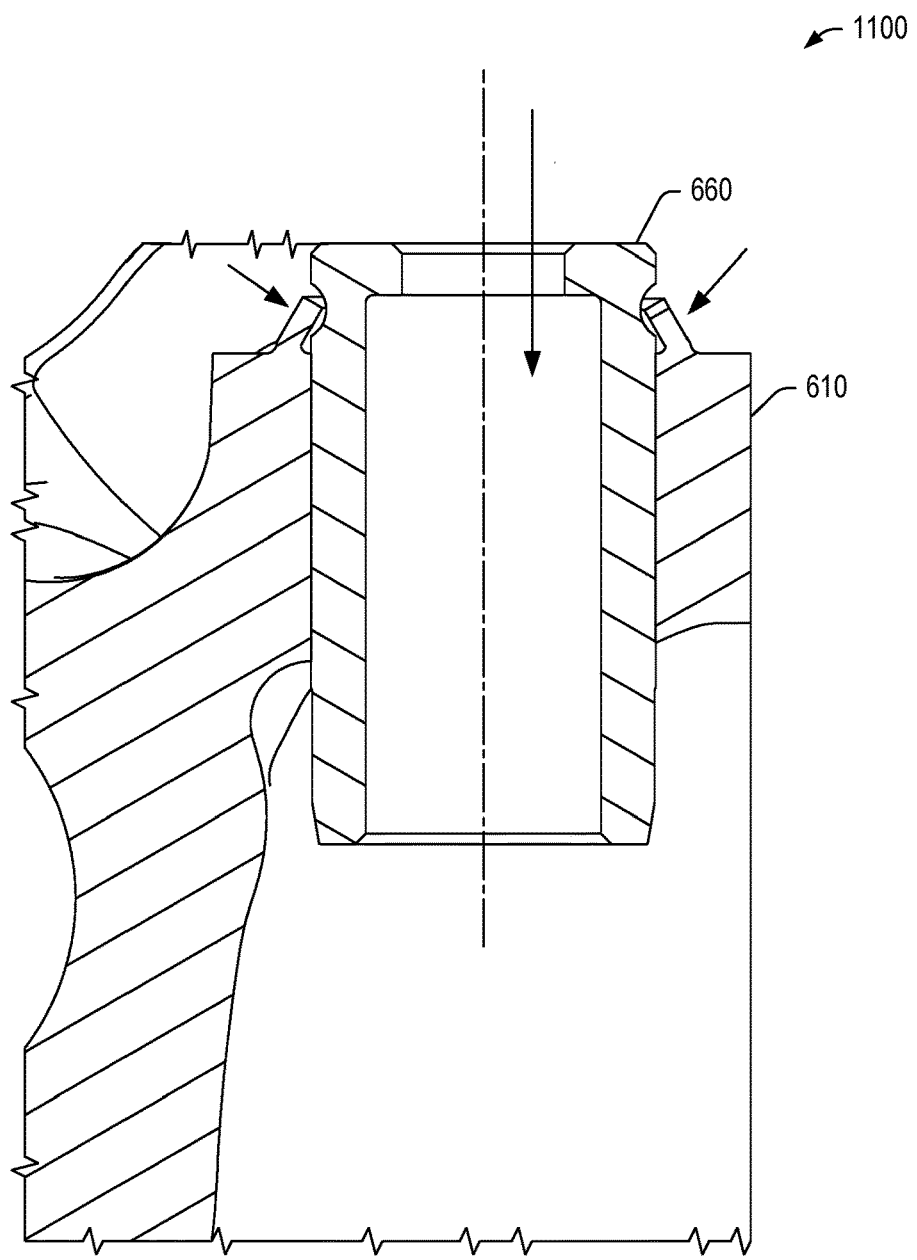
FIG. 11 is a cut-away view of an example of a housing and an example of a bushing as part of an example assembly.

As shown in FIG. 11, the assembly 1100 includes the turbine housing 610 and the bushing 660, which can be inserted into the turbine housing 610. The bushing 660 can be secured to the turbine housing 610, for example, via one or more fixation mechanisms (e.g., welding, crimping, etc.).

Figure 12:
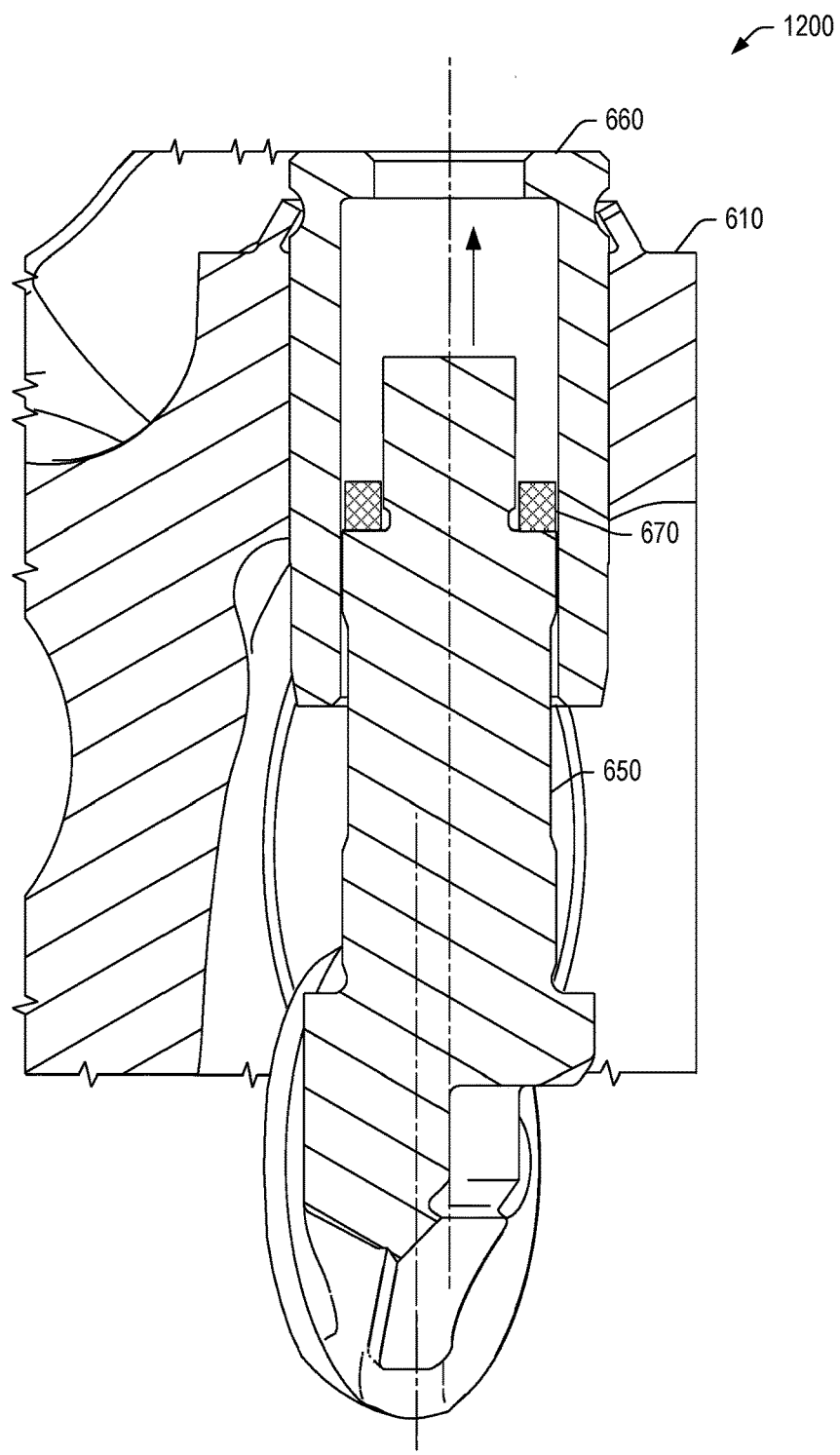
FIG. 12 is a cut-away view of an example of an assembly.

As shown in FIG. 12, the assembly 1200 includes the housing 610, the wastegate 605, the bushing 660 and the mesh spacer 670. As shown, the assembly 1000 of FIG. 10 can be inserted into the bushing 660, which can be secured to the turbine housing 610.

Figure 13:
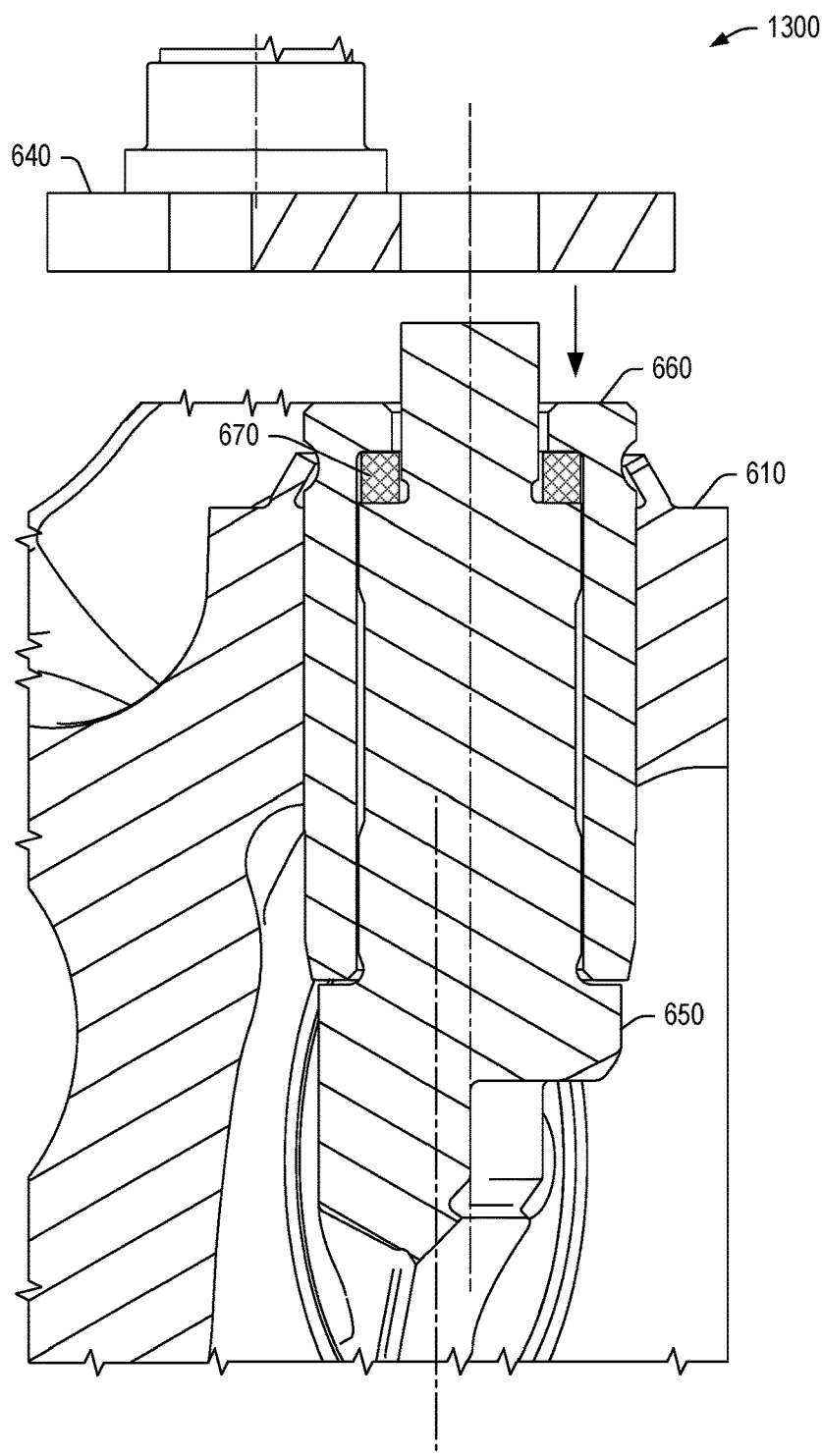
FIG. 13 is a cut-away view of an example of an assembly.

As shown in FIG. 13, the assembly 1300 includes the components of the assembly 1200 of FIG. 12 along with the control arm 640, which can be positioned with respect to the wastegate 605.

Figure 14:
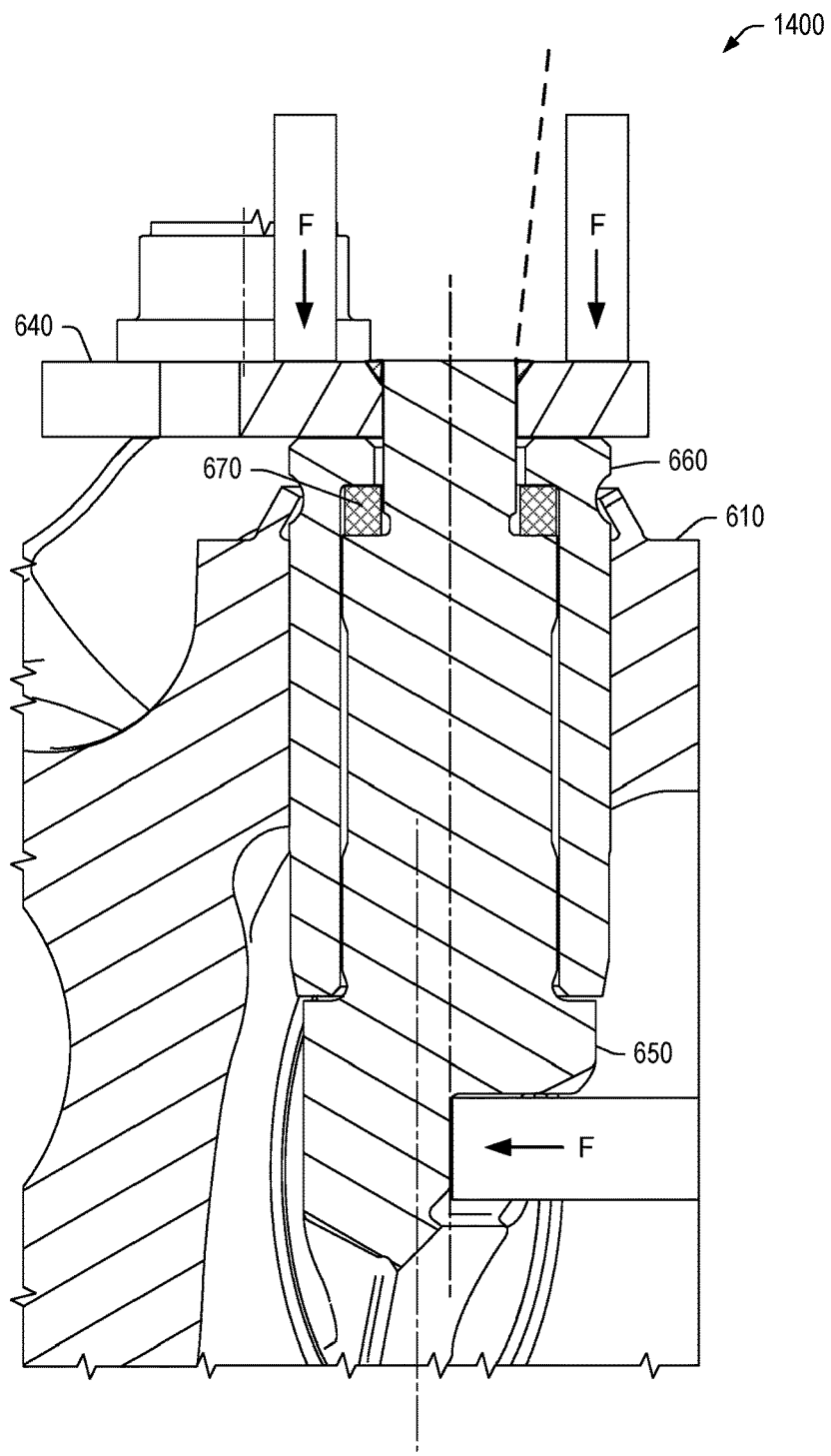
FIG. 14 is a cut-away view of an example of an assembly.

As shown in FIG. 14, the assembly 1400 includes the components of the assembly 1300 of FIG. 13 where one or more forces can be applied via one or more tools. For example, a tool may be utilized to force the plug 690 of the wastegate 605 against the wastegate seat 626 of the turbine housing 610 to assure proper seating and sealing. In such an approach, the control arm 640 can be fixed to the end portion 653 of the shaft 650 of the wastegate 605. As mentioned with respect to the example of FIG. 6, fixation can occur in a manner where the mesh spacer 670 imparts a preload.

As an example, the mesh spacer 670 may apply a load that is sufficient to diminish axial movement of the wastegate 605 under the influence of gravity. For example, the mesh spacer 670 may be of a sufficient stiffness (e.g., and compression) such that no substantial change occurs of the wastegate 605 when a rotational axis of the shaft 650 is substantially aligned with gravity. For example, where the assembly 1400 is installed in a vehicle and where the vehicle changes its orientation (e.g., on a hill, etc.), the wastegate 605 may remain axially positioned as desired without a substantial change in its axial position due to gravity. Without such a mesh spacer, the wastegate 605 may slide axially where one or more axial clearances exist.

As an example, the control arm 640 can be positioned, such that upon fixation to the end portion 653 of the shaft 650, contact (e.g., zero clearance) is targeted between the control arm 640 and the bushing 660. As an example, a clearance may be desired rather than contact (e.g., consider a clearance less than approximately 1 mm). As an example, a fixation process (e.g., welding, etc.) may contact a control arm and a bushing in a manner that causes a mesh spacer to be deformed followed by fixing the control arm to a shaft of a wastegate where the shaft is received at least in part in a stepped bore of the bushing. In such an example, the control arm/shaft can be spatially fixed with a plug of the wastegate in a centered position with respect to a wastegate seat of a housing where the wastegate may be a monoblock wastegate that includes the shaft as an integral portion thereof. Such a process may include, for example, welding in situ of the control arm to the shaft of the wastegate.

As an example, a turbocharger turbine wastegate assembly can include a turbine housing that includes an exterior surface, an interior surface that includes a wastegate seat, and a bore that extends between the exterior surface and the interior surface; a bushing disposed at least partially in the bore of the turbine housing where the bushing includes a stepped bore that includes an axial face; a wastegate that includes a shaft, a plug and an arm, where the arm extends from the shaft and the plug extends from the arm, where the shaft includes an end portion, a first axial face, a journal portion, a second axial face and a shoulder portion, where the first axial face is defined at least in part by an end portion diameter and a journal portion diameter, and where the second axial face is defined at least in part by the journal portion diameter and a shoulder portion diameter; a mesh spacer disposed radially about an axial length of the end portion of the shaft between the axial face of the stepped bore of the bushing and the first axial face of the shaft; and a control arm connected to the end portion of the shaft where an axial length of the bushing is disposed between the mesh spacer and the control arm. In such an example, a weld can be included that connects the control arm to the end portion of the shaft.

As an example, a mesh spacer can impart a load between an axial face of a stepped bore of a bushing and a first axial face of a shaft of a wastegate. In such an example, the load may be a preload at a time of assembly.

As an example, an axial gap can exists between an end of a bushing and a second axial face of a shaft of a wastegate. In such an example, the axial gap can be in an interior space where exhaust may flow (e.g., a chamber space of a wastegate/wastegate seat).

As an example, an axial length of a bushing can exceed an axial length of a bore of a turbine housing such that one or more ends of the bushing extend axially outwardly from one or more corresponding end openings of the bore.

As an example, a bushing can be axially located with respect to a turbine housing. In such an example, the bushing can be axially located such that the bushing remains axially fixed at a fixation location; noting that some amount of thermal expansion may occur as to the bushing with respect to the turbine housing.

As an example, a stepped bore of a bushing can include a first bore portion and a second bore portion. In such an example, a diameter of the second bore portion can exceed a diameter of the first bore portion. In such an example, an axial length of the second bore portion can exceed an axial length of the first bore portion. As an example, a mesh spacer can be disposed in a second bore portion of a bushing that includes a stepped bore (e.g., as defined by a first bore portion and a second bore portion). As an example, a transverse dimension of a mesh spacer may exceed a diameter of a first bore portion of a stepped bore of a bushing.

As an example, a mesh spacer may contact an end portion of a shaft of a wastegate where the shaft is received at least in part in a stepped bore of a bushing that is received at least in part in a bore of a housing.

As an example, a mesh spacer may be a floating mesh spacer. For example, a mesh spacer may be positioned in an assembly without being physically connected to another component via a fixation mechanism such as welding. In such an example, the mesh spacer may float in that it may move independently from one or more other components while responding to movement of one or more other components.

As an example, a mesh spacer can include an uncompressed, free-standing state and a compressed, installed state.

As an example, a wastegate may be a unitary component. For example, a wastegate can be a monoblock wastegate in that it is formed from a single piece of material.

As an example, a method can include positioning a mesh spacer on an end portion of a shaft of a wastegate to form a first subassembly; providing a second subassembly that includes a bushing in a bore of a turbine housing where the bushing includes a stepped bore that includes an axial face; inserting at least a portion of the first subassembly into the stepped bore to contact the mesh spacer and the axial face; and fixing a control arm to the end portion of the shaft where the mesh spacer imparts a load to the bushing and the wastegate.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger turbine wastegate assembly comprising:
   a turbine housing that comprises an exterior surface, an interior surface that comprises a wastegate seat, and a bore that extends between the exterior surface and the interior surface;
   a bushing disposed at least partially in the bore of the turbine housing wherein the bushing comprises a stepped bore that comprises a first bore portion, a second bore portion and an axial face;
   a wastegate that comprises a shaft, a plug and an arm, wherein the arm extends from the shaft and the plug extends from the arm, wherein the shaft comprises an end portion, a first axial face, a journal portion, a second axial face and a shoulder portion, wherein the first axial face is defined at least in part by an end portion diameter and a journal portion diameter, and wherein the second axial face is defined at least in part by the journal portion diameter and a shoulder portion diameter;
a mesh spacer disposed radially about an axial length of the end portion of the shaft between the axial face of the stepped bore of the bushing and the first axial face of the shaft; and
a control arm connected to the end portion of the shaft wherein an axial length of the bushing is disposed between the mesh spacer and the control arm.

2. The turbocharger turbine wastegate assembly of claim 1 comprising a weld that connects the control arm to the end portion of the shaft.

3. The turbocharger turbine wastegate assembly of claim 1 wherein the mesh spacer imparts a load between the axial face of the stepped bore of the bushing and the first axial face of the shaft.

4. The turbocharger turbine wastegate assembly of claim 1 wherein an axial gap exists between an end of the bushing and the second axial face of the shaft.

5. The turbocharger turbine wastegate assembly of claim 1 wherein an axial length of the bushing exceeds an axial length of the bore of the turbine housing.

6. The turbocharger turbine wastegate assembly of claim 1 wherein the bushing is axially located with respect to the turbine housing.

7. The turbocharger turbine wastegate assembly of claim 1 wherein a diameter of the second bore portion exceeds a diameter of the first bore portion.

8. The turbocharger turbine wastegate assembly of claim 7 wherein an axial length of the second bore portion exceeds an axial length of the first bore portion.

9. The turbocharger turbine wastegate assembly of claim 1 wherein the mesh spacer is disposed in the second bore portion.

10. The turbocharger turbine wastegate assembly of claim 1 wherein a transverse dimension of the mesh spacer exceeds a diameter of the first bore portion.

11. The turbocharger turbine wastegate assembly of claim 1 wherein the mesh spacer contacts the end portion of the shaft.

12. The turbocharger turbine wastegate assembly of claim 1 wherein the mesh spacer is a floating mesh spacer.

13. The turbocharger turbine wastegate assembly of claim 1 wherein the mesh spacer comprises an uncompressed, free-standing state and a compressed, installed state.

14. The turbocharger turbine wastegate assembly of claim 1 wherein the wastegate comprises a unitary component.

15. A method comprising:

positioning a mesh spacer on an end portion of a shaft of a wastegate to form a first subassembly wherein the wastegate comprises a plug and an arm, wherein the arm extends from the shaft and the plug extends from the arm, wherein the shaft comprises an end portion, a first axial face, a journal portion, a second axial face and a shoulder portion, wherein the first axial face is defined at least in part by an end portion diameter and a journal portion diameter, and wherein the second axial face is defined at least in part by the journal portion diameter and a shoulder portion diameter;

providing a second subassembly that comprises a bushing in a bore of a turbine housing wherein the turbine housing comprises an exterior surface, an interior surface that comprises a wastegate seat, wherein the bore extends between the exterior surface and the interior surface, and wherein the bushing comprises a stepped bore that comprises a first bore portion, a second bore portion and an axial face;

inserting at least a portion of the first subassembly into the stepped bore to contact the mesh spacer and the axial face of the stepped bore of the bushing wherein the mesh spacer is disposed radially about an axial length of the end portion of the shaft between the axial face of the stepped bore of the bushing and the first axial face of the shaft; and fixing a control arm to the end portion of the shaft wherein an axial length of the bushing is disposed between the mesh spacer and the control arm and wherein the mesh spacer imparts a load to the bushing and the wastegate.

* * * * *